(12) United States Patent
Williams

(10) Patent No.: US 12,434,277 B1
(45) Date of Patent: Oct. 7, 2025

(54) HVAC CLEANING SYSTEM

(71) Applicant: Shannon Williams, Colorado Springs, CO (US)

(72) Inventor: Shannon Williams, Colorado Springs, CO (US)

( * ) Notice: Subject to any disclaimer, the term of this patent is extended or adjusted under 35 U.S.C. 154(b) by 604 days.

(21) Appl. No.: 17/880,097

(22) Filed: Aug. 3, 2022

(51) Int. Cl.
| | | |
|---|---|---|
| *A61L 2/00* | (2006.01) | |
| *A47L 7/00* | (2006.01) | |
| *A61L 2/22* | (2006.01) | |
| *B05B 15/00* | (2018.01) | |
| *B08B 9/00* | (2006.01) | |
| *B08B 9/032* | (2006.01) | |

(52) U.S. Cl.
CPC .............. *B08B 9/0327* (2013.01); *A61L 2/22* (2013.01); *A61L 2202/14* (2013.01); *A61L 2202/15* (2013.01); *B08B 2209/032* (2013.01)

(58) Field of Classification Search
CPC ... B08B 9/27; B08B 9/04; A47L 11/30; A61L 2/22
USPC ............... 422/292; 239/289; 134/198, 22.12; 15/320
See application file for complete search history.

(56) References Cited

U.S. PATENT DOCUMENTS

2010/0219259 A1\* 9/2010 Starcic ...................... A61L 2/22
239/289

\* cited by examiner

*Primary Examiner* — Monzer R Chorbaji

(57) ABSTRACT

The HVAC cleaning system comprises an HVAC system and a cleaning structure. The cleaning structure forms a fluidic connection with the HVAC system. The HVAC system controls a flow of air into and out of a chamber. The HVAC system controls the temperature of the air in the chamber. The cleaning structure injects a disinfection solution as a spray into the air flow controlled by the HVAC system. The disinfection solution cleans the ductwork of the HVAC system.

16 Claims, 4 Drawing Sheets

HVAC CLEANING SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of an apparatus specially designed for HVAC systems characterized by the treatment of the air for disinfection of the HVAC system. (F24F3/16)

Summary of Invention

The HVAC cleaning system comprises an HVAC system and a cleaning structure. The cleaning structure forms a fluidic connection with the HVAC system. The HVAC system controls a flow of air into and out of a chamber. The HVAC system controls the temperature of the air in the chamber. The cleaning structure injects a disinfection solution as a spray into the air flow controlled by the HVAC system. The disinfection solution cleans the ductwork of the HVAC system. 23

These together with additional objects, features and advantages of the HVAC cleaning system will be readily apparent to those of ordinary skill in the art upon reading the following detailed description of the presently preferred, but nonetheless illustrative, embodiments when taken in conjunction with the accompanying drawings.

In this respect, before explaining the current embodiments of the HVAC cleaning system in detail, it is to be understood that the HVAC cleaning system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the HVAC cleaning system.

It is therefore important that the claims be regarded as including such equivalent construction insofar as they do not depart from the spirit and scope of the HVAC cleaning system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
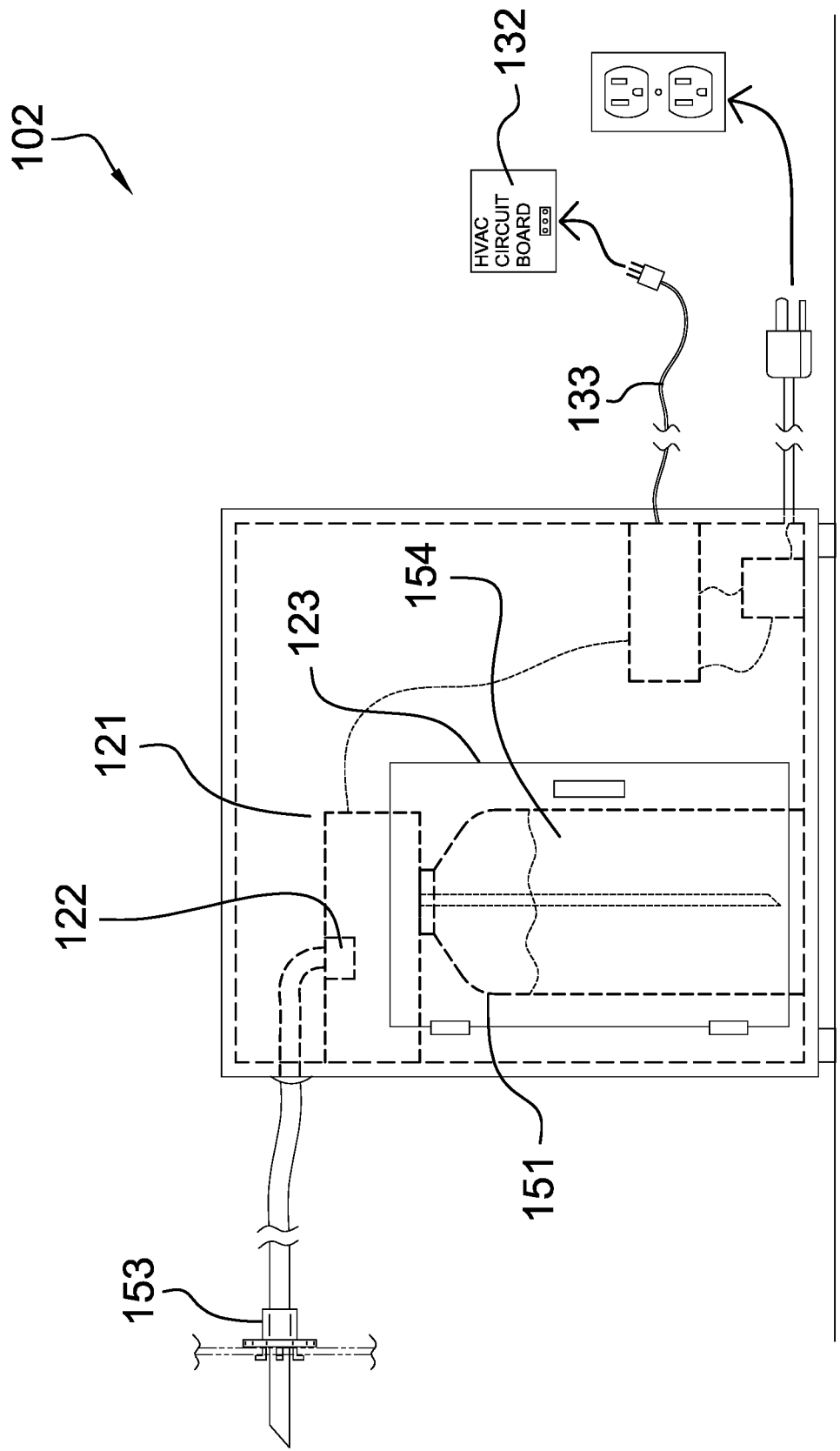
FIG. 1 is a front view of an embodiment of the disclosure.
Figure 2:
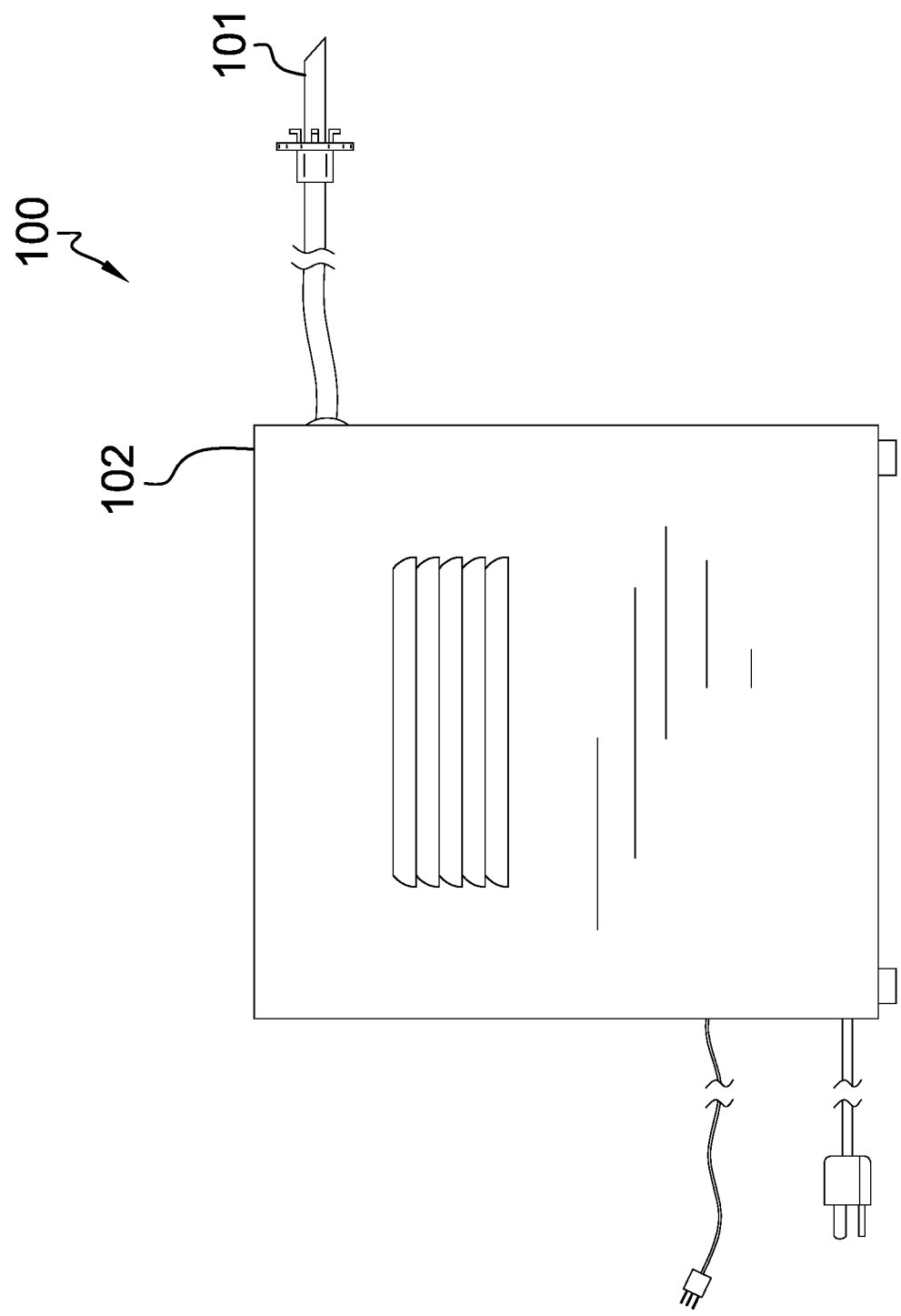
FIG. 2 is a rear view of an embodiment of the disclosure.
Figure 3:
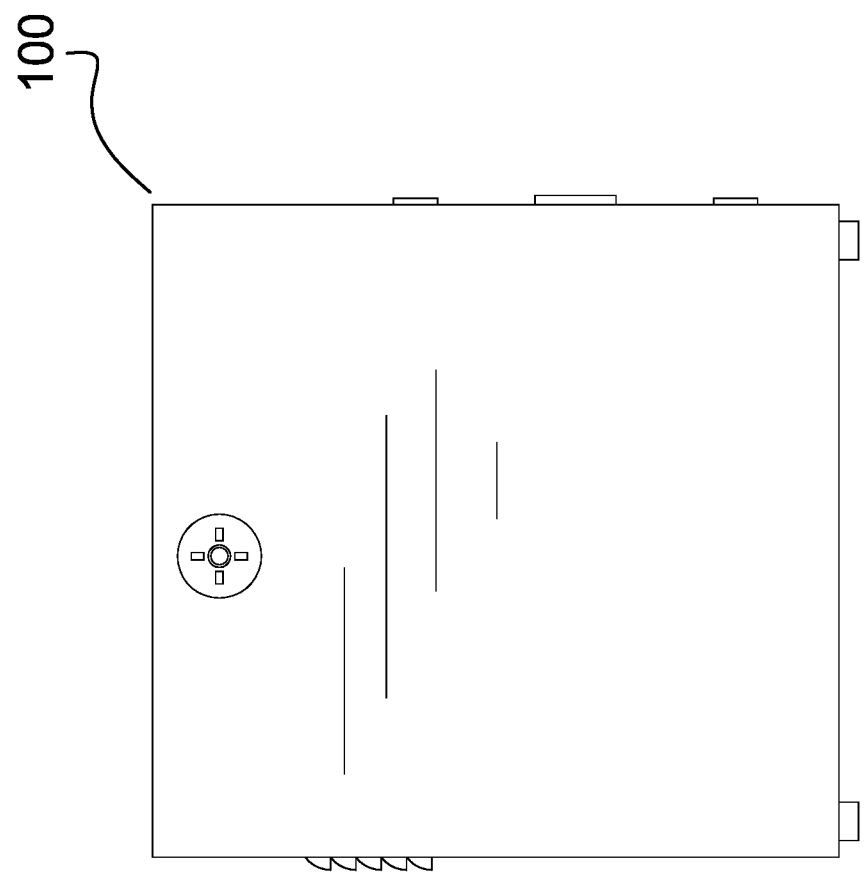
FIG. 3 is a side view of an embodiment of the disclosure.
Figure 4:
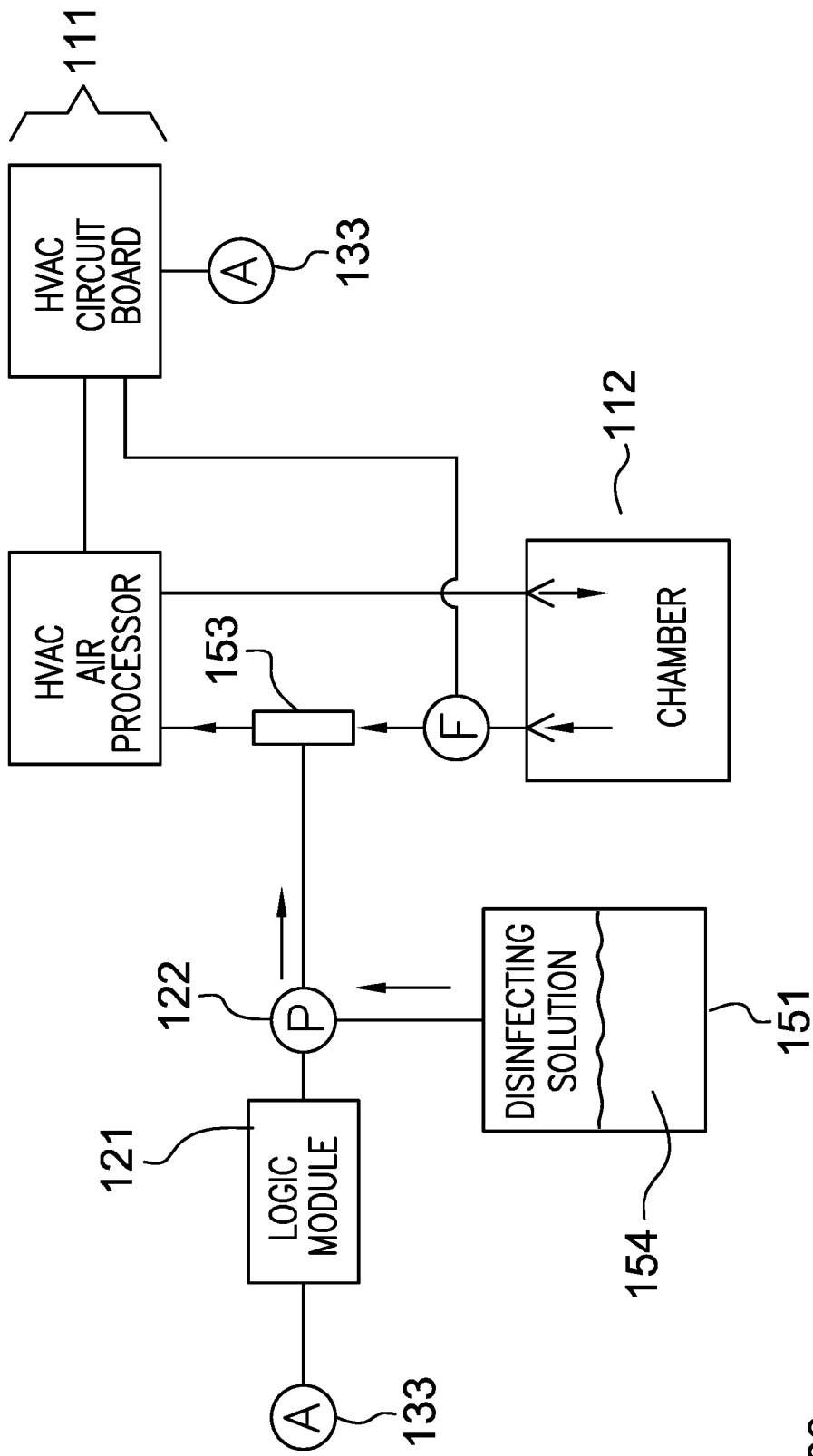
FIG. 4 is a schematic view of an embodiment of the disclosure.

Detailed reference will now be made to one or more potential embodiments of the disclosure, which are illustrated in FIGS. 1 through 4.

The HVAC cleaning system 100 (hereinafter invention) comprises an HVAC system 101 and a cleaning structure 102. The cleaning structure 102 forms a fluidic connection with the HVAC system 101. The HVAC system 101 controls a flow of air into and out of a chamber 112. The HVAC system 101 controls the temperature of the air in the chamber 112. The cleaning structure 102 injects a disinfection solution 123 as a spray into the air flow controlled by the HVAC system 101. The disinfection solution 123 cleans the ductwork of the HVAC system 101.

The HVAC system 101 is an air handling device. The HVAC system 101 forms a fluidic circuit. The HVAC system 101 forms a plurality of fluidic connections with a chamber 112. The HVAC system 101 pumps air into the chamber 112. The HVAC system 101 draws air from the chamber 112 back into the HVAC system 101 to form the fluidic circuit. The HVAC system 101 controls the temperature of the air that flows into the chamber 112. The HVAC system 101 forms a fluidic connection with the cleaning structure 102. The HVAC system 101 receives a spray of disinfection solution 154 from the cleaning structure 102. The HVAC system 101 comprises a HVAC air processor 111 and a chamber 112.

The chamber 112 is an enclosable space within a structure such as a building. The chamber 112 forms a temperature controlled environment. The chamber 112 forms a fluidic connection with the HVAC air processor 111. The chamber 112 receives a flow of air at a controlled temperature from the HVAC air processor 111. The chamber 112 discharges make-up air into the HVAC air processor 111. The chamber 112 further comprises an intake vent 141 and a discharge vent 142. The intake vent 141 is a vent. The intake vent 141 forms a fluid port that draws air from the chamber 112 into the HVAC air processor 111. The discharge vent 142 is a vent. The discharge vent 142 forms a fluid port that discharges the temperature controlled air from the HVAC air processor 111 into the chamber 112.

The HVAC air processor 111 is a heat transfer structure. The HVAC air processor 111 performs a function selected from the group consisting of: a) increasing the temperature of the air flowing through the HVAC system 101; and, b) decreases the temperature of the air flowing through the HVAC system 101. The HVAC air processor 111 is a structure selected from the group consisting of: a) an air conditioning system; and, b) a furnace system. The HVAC air processor 111 comprises a fan 131 and a HVAC circuit board 132.

The fan 131 is a mechanical device. The fan 131 is an electrically powered device. The fan 131 generates the motive forces that transport the air flowing through the HVAC air processor 111. The fan 131 electrically connects to the HVAC circuit board 132.

The HVAC circuit board 132 controls the operation of the fan 131. The fan 131 draws air from the chamber 112 through the intake vent 141 into the HVAC system 101. The fan 131 provides the motive forces necessary to transport the air received 11 through the intake vent 141 through the HVAC air processor 111. The fan 131 provides the motive forces necessary to discharge the air flowing through the HVAC air processor 111 back into the chamber 112 through the discharge vent 142. The HVAC circuit board 132 is an electric circuit. The HVAC circuit board 132 controls the operation of the HVAC air processor 111. The HVAC circuit board 132 controls the temperature of the air that is discharged from the HVAC air processor 111. The HVAC circuit board 132 controls the volume of air flowing through the HVAC air processor 111 by controlling the fan 131.

The HVAC circuit board 132 further comprises a fan on signal 133. The HVAC circuit board 132 electrically connects to the cleaning structure 102 through the fan on signal 133. The HVAC circuit board 132 generates and transmits the fan on signal 133 signal to the logic module 121 of the cleaning structure 102. The fan on signal 133 indicates when the fan 131 is in operation. The cleaning structure 102 discharges the spray of disinfection solution 154 into the air flowing through the HVAC system 101 only when the fan 131 is in operation.

The cleaning structure 102 is a fluid management system. The cleaning structure 102 is a cleaning device. The cleaning structure 102 stores the disinfection solution 154. The cleaning structure 102 pumps the disinfection solution 154 as a spray into the air flowing through the HVAC system 101. The disinfection solution 154 cleans the ductwork transporting the air flow through the HVAC system 101. The cleaning structure 102 comprises a logic module 121, a pump 122, and a disinfection structure 123.

The logic module 121 is an electric circuit. The logic module 121 controls the operation of the cleaning structure 102. The logic module 121 controls the flow of the disinfection solution 154 into the air flowing through the HVAC system 101. The logic module 121 forms an electric connection with the pump 122. The logic module 121 controls the operation of the pump 122.

The pump 122 is a mechanical device. The pump 122 is an electrically powered device. The pump 122 forms a fluidic connection with the disinfection structure 123. The pump 122 generates a pressure differential that transports the disinfection solution 154 through the disinfection structure 123 into the HVAC system 101.

The disinfection structure 123 is a fluid transport structure. The disinfection structure 123 stores the disinfection solution 154. The disinfection structure 123 transports the stored disinfection solution 154 to the pump 122. The disinfection structure 123 transports the disinfection solution 154 under pressure from the pump 122 to the HVAC system 101. The disinfection structure 123 discharges the disinfection solution 154 as a spray into the air flowing through the cleaning structure 102. The disinfection structure 123 further comprises a disinfection bottle 151, a fitting structure 153, and the disinfection solution 154.

The disinfection bottle 151 is a fluid containment structure. The disinfection bottle 151 forms a reservoir that contains the disinfection solution 154 in anticipation of use. The disinfection bottle 151 forms a fluidic connection with the pump 122. The pump 122 generates a pressure differential that transports the disinfection solution 154 from the disinfection bottle 151 into the pump 122.

The fitting structure 153 is a fitting. The fitting structure 153 forms the fluidic connection between the cleaning structure 102 and the HVAC system 101. The fitting structure 153 forms a spray nozzle. The fitting structure 153 forms a fluidic connection with the pump 122. The fitting structure 153 receives the disinfection solution 154 under pressure from the pump 122. The fitting structure 153 discharges the disinfection solution 154 as a spray into the air flowing through the HVAC air processor 111. The fitting structure 153 discharges the disinfection solution 154 at a location between the intake vent 141 and the air processing structure of the HVAC air processor 111.

The disinfection solution 154 is a liquid phase chemical. The disinfection solution 154 is a pharmacologically active media. The disinfection solution 154 contains solutes known to disrupt the biochemical processes of microorganisms.

The following definitions were used in this disclosure:

Air Conditioner: As used in this disclosure, an air conditioner is a mechanical device based on a Carnot cycle. The air conditioner maintains a stable air temperature within one or more chambers in a building. The air conditioner is designed to maintain a temperature that is lower than the temperature of the air that is outside of the building.

Barrier: As used in this disclosure, a barrier is a physical obstacle that forms a boundary between a first space and a second space. The barrier prevents the passage of an object between the first space and the second space.

Bottle: As used in this disclosure, a bottle is a container used for the storage of a fluid.

Chamber: As used in this disclosure, a chamber is an enclosed or enclosable space within a building.

Clean: As used in this disclosure, the term clean refers to an object without dirt, unwanted markings, or undesirable pathogens. When referring to a surface, the term clean can also refer to removing unwanted objects from the surface. The term cleaning refers to the action of making an object clean.

Cleaning Agent: As used in this disclosure, a cleaning agent is a chemical compound used to remove pathogens, dirt, and detritus from a surface.

Cleaning Solution: As used in this disclosure, a cleaning solution is a chemical solution that contains a solvent used to dissolve a cleaning agent.

Container: As used in this disclosure, a container is a structure that forms a protected space (or protection space) used to store and transport an object. The term containment structure is a synonym for container. Use protected space or protection space.

Disinfectant: As used in this disclosure, a disinfectant is a chemical that destroys or inhibits the biochemical activities of pathogenic microorganisms.

Duct: As used in this disclosure, a duct is a tube, pipe, canal, or channel through which air is conducted or conveyed. Ductwork: As used in this disclosure, ductwork is a network of ducts.

Fitting: As used in this disclosure, a fitting is a component that attaches a first object to a second object. The fitting is used to form a fluidic connection between the first object and the second object.

Flow: As used in this disclosure, a flow refers to the passage of a fluid past a fixed point. This definition considers bulk solid materials as capable of flow.

Fluid: As used in this disclosure, a fluid refers to a state of matter wherein the matter is capable of flow and takes the shape of a container it is placed within. The term fluid commonly refers to a liquid or a gas.

Fluid Impermeable: As used in this disclosure, the term fluid impermeable refers to: a) the ability of a structure to not allow a fluid to pass through the structure; or, b) the ability of a material not absorb through the exterior surfaces of the material a fluid that the material is immersed in or exposed to.

Fluidic Circuit: As used in this disclosure, a fluidic circuit is a closed loop path through which a fluid flows. The closed loop will generally initiate and terminate at reservoir.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Fluid Network: As used in this disclosure, a fluid network refers to a transport structure that: a) receives a fluid into the fluid network; b) transports the fluid through a series of pipes, valves, and manifolds; and, c) discharges the fluid from the fluid network.

Fluid Series Circuit: As used in this disclosure, a fluid series circuit refers to a method of connecting a plurality of fluid network elements that are connected to form a single fluid transport path from a first point to a second point in a fluid network.

Fan: As used in this disclosure, a fan is a pump that moves a gas. The first potential embodiment of this disclosure assumes, but does not require, that the fan is a mechanical device with rotating blades that is used to create a flow or current of a gas.

Furnace: As used in this disclosure, a furnace is a mechanical device. The furnace maintains a stable air temperature within one or more chambers in a building. The furnace is designed to maintain a temperature that is higher than the temperature of the air that is outside of the building.

Gas: As used in this disclosure, a gas refers to a state (phase) of matter that is fluid and that fills the volume of the structure that contains it. Stated differently, the volume of a gas always equals the volume of its container.

Heat Transfer: As used in this disclosure, heat transfer refers an exchange of thermal energy between a first object and a second object. In thermodynamics the first and second objects are often referred to as systems. This disclosure assumes that heat transfer occurs through three mechanisms: conduction, convection, and radiation. By conduction is meant that the heat is exchanged through the contact between the first object and the second object which facilitates the direct transfer of the energy of the vibration of the molecules of the first object to the molecules of the second object. By convection is meant that the heat is transferred through the exchange or movement of mass within and between the first object and the second object. By radiation is meant the transfer of heat energy in the form of (typically electromagnetic) waves between the first object and the second object.

HVAC: As used in this disclosure, HVAC is an acronym for Heating Ventilation and Air Conditioning and is a general term that refers to the air handling technology used within a structure.

Liquid: As used in this disclosure, a liquid refers to a state (phase) of matter that is fluid and that maintains, for a given pressure, a fixed volume that is independent of the volume of the container.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Make-Up Air: As used in this disclosure, make-up air is air that permitted to enter a enclose space for the purpose of replacing air that has been evacuated in some manner, for example by a fan, from the enclosed space.

Microorganism: As used in this disclosure, a microorganism is an organism too small to be viewed by the unaided eye. Microorganisms are typically single celled organisms such as bacteria, yeast, viruses, protozoa, fungi, and algae. A pathogen refers to a microorganism that has the potential to cause illness or disease.

Negative Space: As used in this disclosure, negative space is a method of defining an object through the use of open or empty space as the definition of the object itself, or, through the use of open or empty space to describe the boundaries of an object.

Non-Polar Molecule: As used in this disclosure, a non-polar molecule refers to a molecular structure that: a) is electrically neutral; and, b) has a uniform spatial distribution of the electrons within the molecule.

Nozzle: As used in this disclosure, a nozzle is a device that receives fluid under pressure and releases the fluid in a controlled manner into an environment. An intake nozzle refers to a device that generates a negative pressure within the nozzle structure such that the intake nozzle draws a fluid into the intake nozzle from a reservoir.

Phase: As used in this disclosure, phase refers to the state of the form of matter. The common states of matter are solid, liquid, gas, and plasma.

Phase Change Terminology: As used in this disclosure, the following terms are used to describe a phase change. A phase change from a solid phase to a liquid phase is called melting. A phase change from a liquid phase to a solid phase is called freezing or solidification. A phase change from a solid phase to a gas phase is called sublimation. A phase change from a gas phase to a solid phase is called deposition. A phase change from a liquid phase to a gas phase is called evaporation. A phase change from a gas phase to a liquid phase is called condensation. A phase change from a gas phase to a plasma phase is called ionization. A phase change from a plasma phase to a gas phase is called recombination.

Plasma: As used in this disclosure, plasma refers to a state (phase) of matter wherein the outer valence electrons of an atom (or molecule) have been separated from their nucleus but remain with the matter. A plasma is an electrically neutral state of matter that is formed from the ions of the separated atoms. Plasmas generally, but not necessarily behaves like a gas in that a plasma fills the volume of the structure that contains it. The flow of a plasma through the atmosphere is called an arc. An arc is generally created when the atmosphere is subjected to an electric field that ionizes the molecules forming the atmosphere.

Polar Molecule: As used in this disclosure, a polar molecule refers to a molecular structure that: a) is electrically neutral; but, b) does not have a uniform spatial distribution of the electrons within the molecule. A polar molecule will present one or more electrically positive poles and the same number of electrically negative poles within the molecular structure.

Polarity: As used in this disclosure, the term polarity is used to describe a physical property or physical characteristic wherein: 1) the physical property or physical characteristic manifests two opposing attributes, tendencies, characteristics, or principals; and, 2) the two opposing attributes, tendencies, characteristics, or principals have an intrinsic separation, alignment, or orientation.

Port: As used in this disclosure, a port is an aperture formed in an object that allows fluid to flow through the boundary of the object Processed Air Discharge: As used in this disclosure, a processed air discharge is a port or a pipe of an HVAC system through which the air processed by an air handling module of the HVAC is released into the system. The air handling module is selected from group consisting of an air heating module and an air cooling module (AC).

Protected Space: As used in this disclosure, a protected space is a negative space within which an object is stored. The protected space is enclosed by a barrier structure that: a) prevents damage to the object contained within the protected space; b) maintains an environment suitable within the protected space that is appropriate for the object; protects the object within the protected space from potential dangers that are outside of the protected space; or, d) maintaining the privacy of the object within the protected space.

Pump: As used in this disclosure, a pump is a mechanical device that uses suction or pressure to raise or move fluids, compress fluids, or force a fluid into an inflatable object. Within this disclosure, a compressor refers to a pump that is dedicated to compressing a fluid or placing a fluid under pressure.

Reservoir: As used in this disclosure, a reservoir refers to a container or containment system that is configured to store a fluid.

Solid: As used in this disclosure, a solid refers to a state (phase) of matter that: 1) has a fixed volume; and, 2) does not flow.

Solution: As used in this disclosure, a solution is a uniform mixture of two or more compounds in a liquid phase. The major component selected from the two or more compounds that forms the solution is called the solvent. The components remaining in the two or more compounds are called the solute. A polar solvent is a solvent formed from polar molecules. A non-polar solvent is a solvent formed from non-polar molecules. The rule of thumb that "like dissolves like" states that: a) solutes formed from polar molecules will dissolve in polar solvents but will not dissolve in non-polar solvents; and, b) solutes formed from non-polar molecules will dissolve in non-polar solvents but will not dissolve in polar solvents.

Spray: As used in this disclosure, a spray is a plurality of liquid drops dispersed in a gas.

Spray Nozzle: As used in this disclosure, a spray nozzle is a device that receives liquid under pressure and disperses that liquid into the atmosphere as a spray.

Vent: As used in this disclosure, a vent is an opening in a structure that allows for the flow of gas through the boundary of the structure.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:
1. An HVAC cleaning system comprising
an HVAC system and a cleaning structure;
wherein the cleaning structure forms a fluidic connection with the HVAC system;
wherein the HVAC system controls a flow of air into and out of a chamber;
wherein the cleaning structure injects a disinfection solution as a spray into the air flow controlled by the HVAC system;
wherein the HVAC system forms a fluidic connection with the cleaning structure;
wherein the HVAC system receives the spray of disinfection solution from the cleaning structure;
wherein the cleaning structure is a fluid management system;
wherein the cleaning structure stores the disinfection solution;
wherein the cleaning structure pumps the disinfection solution as a spray into the air flowing through the HVAC system;
wherein the disinfection solution cleans the ductwork transporting the air flow through the HVAC system;
wherein the cleaning structure comprises a logic module, a pump, and a disinfection structure;
wherein the logic module electrically connects to the pump;
wherein the pump forms a fluidic connection with the disinfection structure;
wherein the HVAC circuit board transmits the fan on signal to the logic module such that the logic module discharges the spray of disinfection solution into the air flowing through the HVAC system only when the fan is in operation;

wherein the pump generates a pressure differential that transports the disinfection solution through the disinfection structure into the HVAC system;

wherein the disinfection structure transports the disinfection solution under pressure from the pump to the HVAC system;

wherein the disinfection structure discharges the disinfection solution as a spray into the air flowing through the cleaning structure;

wherein the disinfection structure further comprises a disinfection bottle, a fitting structure, and the disinfection solution;

wherein the disinfection bottle is a fluid containment structure;
wherein the disinfection bottle forms a reservoir that contains the disinfection solution in anticipation of use;
wherein the disinfection bottle forms a fluidic connection with the pump;
wherein the pump generates a pressure differential that transports the disinfection solution from the disinfection bottle into the pump.

2. The HVAC cleaning system according to claim 1
wherein the HVAC system controls the temperature of the air in the chamber.

3. The HVAC cleaning system according to claim 2
wherein the HVAC system forms a fluidic circuit;
wherein the HVAC system forms a plurality of fluidic connections with the chamber;
wherein the HVAC system pumps air into the chamber;
wherein the HVAC system draws air from the chamber back into the HVAC system;
wherein the HVAC system controls the temperature of the air that flows into the chamber.

4. The HVAC cleaning system according to claim 3
wherein the HVAC system further comprises a HVAC air processor;
wherein the chamber forms a fluidic connection with the HVAC air processor.

5. The HVAC cleaning system according to claim 4
wherein the chamber is an enclosable space;
wherein the chamber forms a temperature controlled environment;
wherein the chamber receives a flow of air at a controlled temperature from the HVAC air processor;
wherein the chamber discharges air into the HVAC air processor.

6. The HVAC cleaning system according to claim 5
wherein the chamber further comprises an intake vent and a discharge vent;
wherein the intake vent is a vent;
wherein the intake vent forms a fluid port that draws air from the chamber into the HVAC air processor;
wherein the discharge vent is a vent;
wherein the discharge vent forms a fluid port that discharges the temperature controlled air from the HVAC air processor into the chamber.

7. The HVAC cleaning system according to claim 6
wherein the HVAC air processor is a heat transfer structure;
wherein the HVAC air processor performs a function selected from the group consisting of: a) increasing the temperature of the air flowing through the HVAC system; and, b) decreases the temperature of the air flowing through the HVAC system.

8. The HVAC cleaning system according to claim 7
wherein the HVAC air processor comprises a fan and the HVAC circuit board;
wherein the fan electrically connects to the HVAC circuit board;
wherein the HVAC circuit board controls the operation of the fan.

9. The HVAC cleaning system according to claim 8
wherein the fan is a mechanical device;
wherein the fan is an electrically powered device;
wherein the fan generates the motive forces that transport the air flowing through the HVAC air processor;
wherein the fan draws air from the chamber through the intake vent into the HVAC system;
wherein the fan provides the motive forces necessary to transport the air received through the intake vent through the HVAC air processor;
wherein the fan provides the motive forces necessary to discharge the air flowing through the HVAC air processor back into the chamber through the discharge vent.

10. The HVAC cleaning system according to claim 9
wherein the HVAC circuit board is an electric circuit;
wherein the HVAC circuit board controls the operation of the HVAC air processor;
wherein the HVAC circuit board controls the temperature of the air that is discharged from the HVAC air processor;
wherein the HVAC circuit board controls the volume of air flowing through the HVAC air processor by controlling the fan.

11. The HVAC cleaning system according to claim 10
wherein the HVAC circuit board further comprises a fan on signal;
wherein the HVAC circuit board electrically connects to the cleaning structure through the fan on signal.

12. The HVAC cleaning system according to claim 11
wherein the logic module is an electric circuit;
wherein the logic module controls the operation of the cleaning structure;
wherein the logic module controls the flow of the disinfection solution into the air flowing through the HVAC system.

13. The HVAC cleaning system according to claim 12
wherein the logic module controls the operation of the pump.

14. The HVAC cleaning system according to claim 13
wherein the pump is a mechanical device;
wherein the pump is an electrically powered device;
wherein the pump forms a fluidic connection with the disinfection structure.

15. The HVAC cleaning system according to claim 14
wherein the disinfection structure is a fluid transport structure;
wherein the disinfection structure stores the disinfection solution;
wherein the disinfection structure transports the stored disinfection solution to the pump.

16. The HVAC cleaning system according to claim 15
wherein the disinfection bottle forms a reservoir that contains the disinfection solution in anticipation of use;
wherein the fitting structure is a fitting;
wherein the fitting structure forms the fluidic connection between the cleaning structure and the HVAC system;
wherein the fitting structure forms a spray nozzle;
wherein the fitting structure forms a fluidic connection with the pump;
wherein the fitting structure receives the disinfection solution under pressure from the pump;
wherein the fitting structure discharges the disinfection solution as a spray into the air flowing through the HVAC air processor;
wherein the fitting structure discharges the disinfection solution at a location between the intake vent and the air processing structure of the HVAC air processor;
wherein the disinfection solution is a liquid phase chemical;
wherein the disinfection solution is a pharmacologically active media.

* * * * *